Aug. 15, 1933.  W. SCHUMANN  1,922,219
CULTIVATOR
Filed Aug. 7, 1930
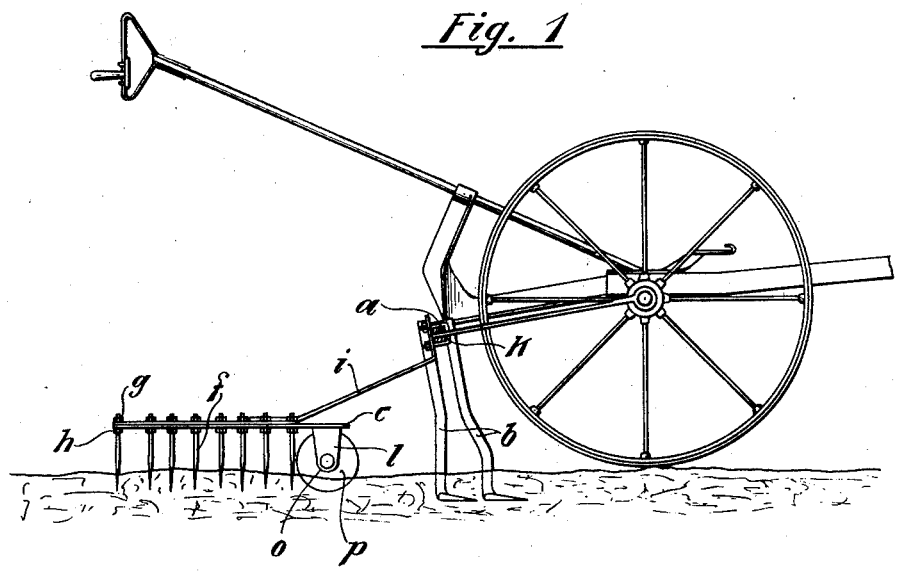
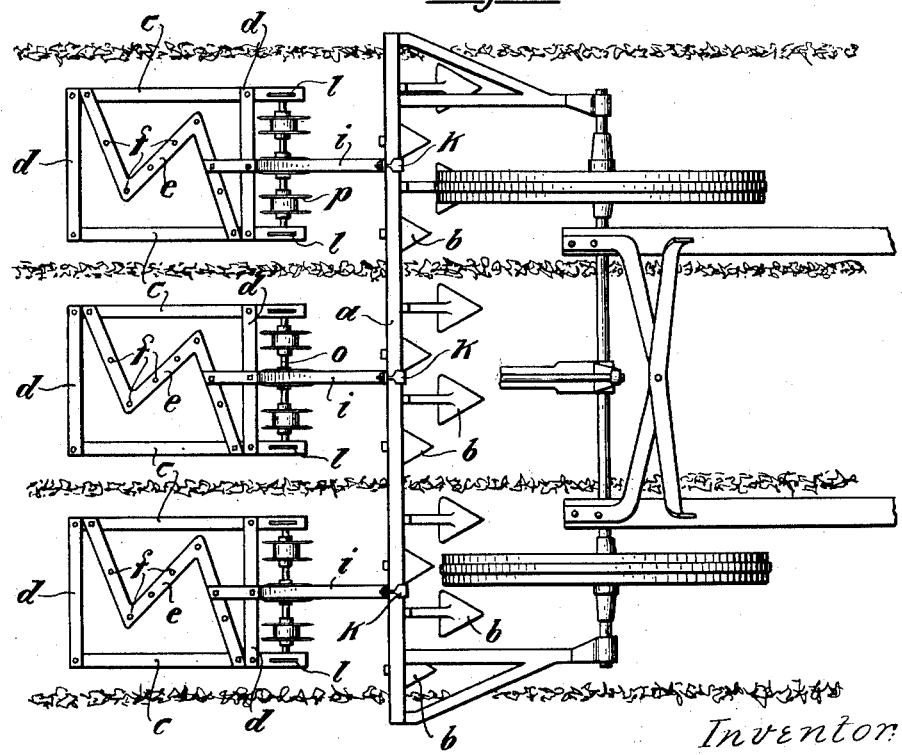
Inventor:
Walter Schumann.

Patented Aug. 15, 1933

1,922,219

UNITED STATES PATENT OFFICE 1,922,219

CULTIVATOR

Walter Schumann, Gornitz, near Leisnig, Germany

Application August 7, 1930, Serial No. 473,533, and in Germany June 5, 1930

1 Claim. (Cl. 97—8)

In the cultivation of turnips and the like, a frequent heaping up of the earth against the plant rows is necessary, for which purpose hoeing machines are employed. Alternate wetting and drying forms the earth into a crust which is broken up into lumps under the action of the hoes, and to break up these lumps the hoeing machines are sometimes combined with a drill harrow or roller.

The object of the present invention is to produce a simple machine of this kind, and the invention consists in the provision of a carrier beam connected by means of end brackets to a wheel axle, a plurality of hoeing implements connected to said beam, and a plurality of harrow units connected by means of arms rigidly and adjustably to said beam so as to follow the hoeing implements, each harrow unit comprising a frame having a sinuous or zig-zag-shaped bar to which the tines are detachably connected, and earth-crashing disc rollers mounted in bearing brackets depending from each harrow frame.

Fig. 1 of the accompanying drawing represents a side view of the machine, and

Fig. 2 is a top view of the same.

The machine has a frame comprising a carrier beam $a$ composed of two parallel spaced bars. Brackets $q$ at the ends of the beam are attached to an axle $r$ mounted in ground wheels $s$. Connected to the beam $a$ is a plurality of hoeing implements $b$ and also a drill harrow comprising a plurality of units arranged so as to follow the hoes, one unit between each pair of plant rows. Each unit comprises a rectangular frame composed of longitudinal bars $c$ and cross bars $d$ and in addition a bar $e$ carried sinuously or in zig-zag from one corner of the frame to the corner diagonally opposite thereto. The bar $e$ is fitted with tines $f$ which, owing to the shape of the bar, form rows which are inclined to the travelling direction of the machine. By this arrangement the lumps, instead of being pushed forward by the tines, will be diverted from one tine to another and effectively broken up. The bars $c$ and $d$ may also be fitted with tines, at least at the corners as shown.

The tines are screw-threaded and fitted with nuts $g$ and $h$ whereby they are secured in apertures in the bars. The lower nuts $h$ may be replaced by rigid shoulders.

Each harrow unit is secured to the beam $a$ by means of an arm $i$ and a clamp $k$ which embraces both bars of the beam and which can be adjusted on the latter for regulating the distance of the harrow units from one another. The harrow units are rigidly held by the arms $i$ and can be raised from the ground together with the hoes $b$ by the usual means.

The harrow units may also be provided with earth-crushing disc rollers $p$ mounted on shafts $o$. The bearing brackets $l$ for the latter may either be secured to extensions of the frame members $c$, as shown in the drawing, or to the arms $i$. The brackets may be adjustable.

I claim:

A beet hoeing machine comprising a wheel-supported tool bar, a plurality of harrow units each comprising a square frame, a zig-zag bar carried diagonally across each of said frames, tines secured detachably to said zig-zag bars and to the frame members, and arms whereby the harrow units are rigidly connected to said tool bar in adjustable spacing.

WALTER SCHUMANN.